(12) United States Patent
Hu et al.

(10) Patent No.: US 10,972,462 B2
(45) Date of Patent: Apr. 6, 2021

(54) ELECTRONIC ACCOUNT RECOVERY THROUGH ACCOUNT CONNECTIONS

(71) Applicant: Microsoft Technology Licensing, LLC, Redmond, WA (US)

(72) Inventors: Juanjuan Hu, Mountain View, CA (US); Kirsten Rauffer, Redmond, WA (US); Derek Koh, Sunnyvale, CA (US); Yi Qun Zhou, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 208 days.

(21) Appl. No.: 16/147,299

(22) Filed: Sep. 28, 2018

(65) Prior Publication Data
US 2020/0106777 A1 Apr. 2, 2020

(51) Int. Cl.
*H04L 29/06* (2006.01)
*G06F 21/45* (2013.01)
*G06F 21/43* (2013.01)

(52) U.S. Cl.
CPC .......... *H04L 63/0884* (2013.01); *G06F 21/43* (2013.01); *G06F 21/45* (2013.01); *H04L 63/12* (2013.01)

(58) Field of Classification Search
CPC ....... H04L 63/884; H04L 63/12; G06F 21/43; G06F 21/45
USPC .......................................................... 726/2
See application file for complete search history.

(56) References Cited

U.S. PATENT DOCUMENTS

| | | | |
|---|---|---|---|
| 2007/0136573 A1* | 6/2007 | Steinberg | G06F 21/43 713/155 |
| 2014/0090015 A1* | 3/2014 | Fuse | H04L 9/083 726/2 |
| 2014/0130148 A1* | 5/2014 | Sako | G06F 21/36 726/19 |
| 2017/0098067 A1* | 4/2017 | Paluri | G06F 21/31 |

* cited by examiner

*Primary Examiner* — Jacob Lipman
(74) *Attorney, Agent, or Firm* — Hickman Becker Bingham Ledesma LLP

(57) ABSTRACT

A method for managing account data and handling account recovery requests are disclosed. The method comprises a multi-level identity verification process, including a first level where a specific computing device requesting recovery of an electronic account is requested to identify a trusted contact for the electronic account and a second level where the specific computing device is requested to provide a dynamically generated security code that has been communicated to a trusted contact identified by the specific computing device.

20 Claims, 10 Drawing Sheets

ELECTRONIC ACCOUNT RECOVERY THROUGH ACCOUNT CONNECTIONS

TECHNICAL FIELD

The present disclosure relates to electronic account management and, more specifically, to efficient, secure online identity verification and account recovery through account connections.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, electronic communication is integral to our lives. The unit of electronic communication is an electronic account hosted by a digital computer system, such as an email server or an e-commerce platform. An electronic account is generally defined by account credentials, such as the combination of an account ID and a password, provided by the owner of the electronic account. Use of the electronic account requires knowledge of the account credentials.

The owner of an electronic account who has lost knowledge of the account credentials for the electronic account would want to recover the electronic account or the access thereof by regaining knowledge of the account credentials or resetting the account credentials. However, a non-owner who never has knowledge of the account credentials might also want to gain knowledge of the account credentials or reset the account credentials for illegitimate purposes. Therefore, the account recovery process is generally carefully controlled to reduce the chance of granting access to an electronic account to a non-owner.

The account recovery process can comprise one or more steps. In one approach, in setting up an electronic account, the owner is asked to identify a primary communication account, such as an email account, so that account setup can continue or account recovery can begin by accessing the primary communication account. For example, the digital server hosting the electronic account might send a link for resetting account credentials for the electronic account to the primary communication account. When the owner has also lost knowledge of the account credentials for the primary communication account, however, account recovery might continue with a relatively laborious process, such as uploading a photo identification to the digital server. In reality, losing knowledge of the account credentials for the primary communication account might occur quite often due to graduation from school, changing employers, or other reasons. In general, it would be helpful to have an account recovery process that maximizes the accuracy of authenticating the requester while minimizing the inconvenience to the requester.

DETAILED DESCRIPTION

Figure 1:
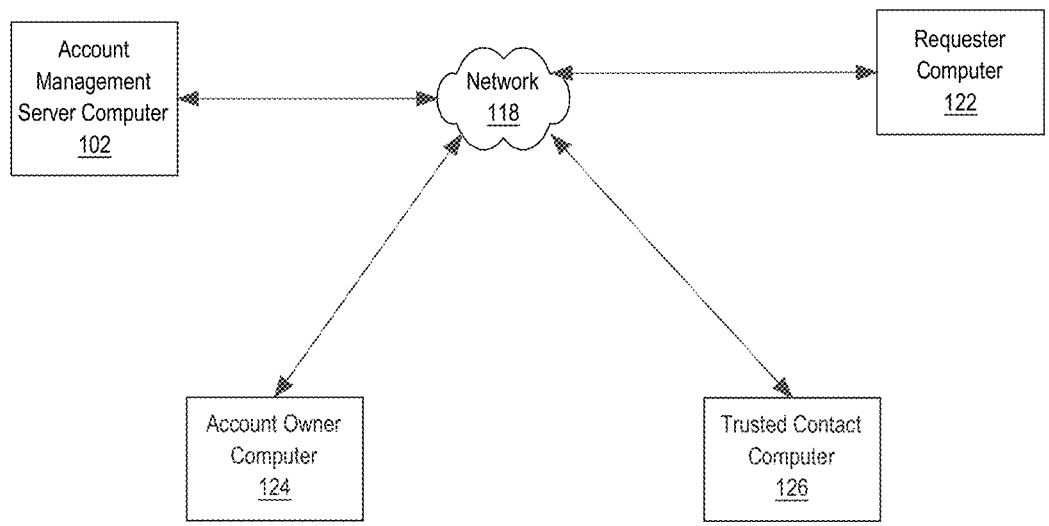
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An account management server computer (server) and related methods for managing account data and handling account recovery requests are disclosed. In some embodiments, the server is programmed to manage electronic accounts created by account owners. The account owner of a first electronic account may specify a connection or relationship of the first electronic account with a second electronic account. The account owner can further specify the type of the relationship, including a "trusted contact", which can be used for certain activities involving the first electronic account, such as account recovery. The term "trusted contact" can refer to the relationship with the second electronic account or the second electronic account.

In some embodiments, the server is programmed to receive a request from a specific computing device to recover the first electronic account by receiving existing account credentials for the first electronic account or resetting the account credentials. The server is programmed to carry out a multi-level identity verification process to verify that the specific computing device or the associated user is the owner of the first electronic account. The identity verification process is based on knowledge of and actual communication with the trusted contacts.

In some embodiments, in the first level, the server is programmed to request identification of one of the trusted contacts for the first electronic account. The server is configured to select and present a set of items, each of which can be used to identify an electronic account, such as the photo of an associated user, to the specific computing device. The set of items correspond respectively to a trusted contact for the first electronic account and other electronic accounts. Upon receiving a selection of one of the set of items that represents one of the trusted contacts from the specific computing device, the server can be programmed to select another set of items and repeat the process or move on to the next level. Upon receiving a selection of one of the set of items that does not represent any of the trusted contacts, the server is programmed to reject the request or revert to a backup, less-desirable approach of handling the request.

In some embodiments, in the second level, the server is programmed to request provision of a dynamically generated security code. The server is programmed to generate a security code and transmit it to one of the trusted contacts for the first electronic account that has been identified by the specific computing device. The security code can be a six-digit integer, for example, which can be communicated online or offline. The server can be configured to transmit with the security code an instruction of what the security code is and how the security code should be used, including a request to forward the security code to the owner of the first computing device. Upon receiving, from the specific computing device, an input that matches the security code, the server is programmed to approve the request for recovering the first electronic account. For example, the specific computing device might be allowed to update information regarding a primary communication account associated with the first electronic account so that a link to updating the account credentials can be sent to the updated primary communication account and accessed by the specific computing device. Upon receiving an input that does not match the security code, which can be due to a lack of communication between the trusted contact and the specific computing device, the server is programmed to similarly reject the request or revert to a backup, less desirable approach of handling the request.

The server offers several technical benefits. The server strengthens the security of electronic accounts by enforcing a strong authentication process. By requesting identification of a small number of trusted contacts for an electronic account out of many possible connections or non-connections with the electronic account, the chance of an inaccurate identity verification is significantly reduced. That chance is further reduced through repeated identification of multiple trusted contacts followed by provision of a dynamically generated security code that is difficult to guess and only available from a trusted contact. In addition, the server enables reduction of computational time compared to other approaches. Existing account data related to trusted contacts can be efficiently utilized for reliable identity verification without having to process substantial new data, such as receiving an image of a photo ID, extracting identity information from the image, and cross-checking that identity information.

Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements connected in various manners.

In some embodiments, the networked computer system comprises an account management server computer (server) 102, a requester computer 122, an account owner computer 124, and a trusted contact computer 126, which are communicatively coupled directly or indirectly via one or more networks 118.

In some embodiments, the server 102 broadly represents one or more computers, virtual computing instances, and/or instances of a server-based application that is programmed or configured to host or execute functions including but not limited to managing electronic account data, including connections between electronic accounts, and communicating with various other devices involved in account setup and recovery. The server 102 can comprise a server farm, a cloud computing platform, a parallel computer, special-purpose hardware, or any other computing facility with sufficient computing power in data processing, data storage, and network communication for the above-described functions.

The account owner computer 124 associated with a first user is programmed to communicate with the server 102 to create, update, or otherwise maintain a first electronic account. The trusted contact computer 122 associated with a second user is programmed to communicate with the server 102 to create, update, or otherwise maintain a second electronic account. The account owner computer 124 and the trusted contact computer 126 are also programmed to communicate with each other through the server 102. Such communications can be for any purpose and tracked by the server 102. The requester computer 122 is programmed to communicate with the server 102 to request recovery of the first electronic account or obtain access to the first electronic account. The trusted contact computer 126 is programmed to further communicate with the server 102 and directly with the requester computer 122 to recover the first electronic account.

Each of the requester computer 122, the account owner computer 124, and the trusted contact computer 126 may comprise computing facility with sufficient computing power in data processing, data storage, and network communication for the above-described functions. In some embodiments, each of the requester computer 122, the account owner computer 124, and the contact computer 126 can comprise a desktop computer, laptop computer, tablet computer, smartphone, wearable device, etc.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the account owner computer 124 is programmed to set up the first electronic account with the server 102 and designate the second electronic account as a trusted contact for the first electronic account. Subsequently, the requester computer 122, which might be identical to the account owner computer 124, is programmed to send a request to the server 102 to regain access to the first electronic account. The server 102 is programmed to subject the requester computer 122 through a multi-level identity verification process, such as a two-factor authentication. At the first level, the server 102 is programmed to cause a display of certain items representing different electronic accounts or non-accounts managed by of the server 102. The server is programmed to further determine a success of the first level, which triggers the second level, upon from the requester computer 122 receiving a selection of an item representing one of the trusted contacts for the first electronic account, which corresponds to an identification of a trusted contact. At the second level, the server 102 is programmed to transmit a security code to a computing device associated with one of the trusted contacts identified by the requester computer 122, such as the trusted contact computer 126, and determine a success, which concludes the identity verification process, upon receiving the security code from requester computer 122. At the conclusion of the identity verification process, the server is programmed to regrant access to the first electronic account to the requester computer 122 in response to the request.

Example Computer Components

Figure 2:
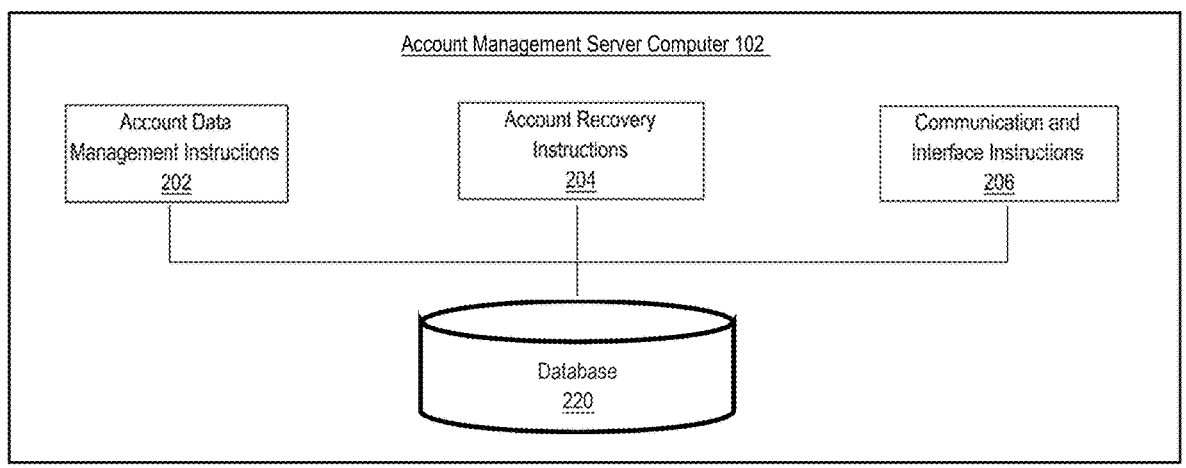
FIG. 2 illustrates example computer components of an account management server computer.

FIG. 2 illustrates example computer components of an account management server computer. FIG. 2 is shown in simplified, schematic format for purposes of illustrating a clear example and other embodiments may include more, fewer, or different elements connected in various manners. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 comprises an account data management component having account data management instructions 202, an account recovery component having account recovery instructions 204, and a communication and interface component management component having communication and interface instructions 206. In addition, the server 102 comprises a database component 220.

In some embodiments, the account data management instructions 202 allow management of various types of data associated with one or more electronic accounts. The types of data associated with a first electronic account for a first user may include information identifying the first user, a first computing device of the first user, or one or more other electronic accounts related to or connected with the first electronic account. The types of data associated with the first electronic account may also include information defining and securing the first electronic account. The management of account data may include creation, update, or deletion of the types of data associated with the first electronic account, such as collecting particular designations of other electronic accounts specifically for account recovery or other purposes or tracking communications with other electronic accounts for automatic classification of account connections.

In some embodiments, the account recovery instructions 204 enable recovery of an electronic account, including re-activating the electronic account or resetting certain types of data in the electronic account to renew access to the electronic account. The recovery of the first electronic account includes an authentication of the requester of the recovery through knowledge of the types of data associated with the first electronic account, such as the particular designations of the other electronic accounts, and real-time communication with those other electronic accounts.

In some embodiments, the communication and interface instructions 206 allow interaction with various computing devices, such as the requester computer 122, the account owner computer 124, or the trusted contact computer 126. The interaction may involve transmission of relevant data through application programming interfaces or transmission of relevant data together with control instructions for graphical user interfaces. The relevant data may include account data or additional data specifically used for account recovery, such as representations of electronic accounts and non-accounts or security codes.

In some embodiments, the database component 220 is programmed or configured to manage relevant data structures and store relevant data for functions performed by the server 102. The data may be related to electronic accounts, communications among electronic accounts, or data specific to recovery of electronic accounts, such as specific digital models or sets of computer-executable constructions for assembling a set of items for a user selection or for generating random security codes.

Functional Descriptions

Collecting Account Data and Identification Data

In some embodiments, the server is programmed or configured with data structures and/or database records that are arranged to create and maintain an electronic account associated with a user of a computing device. The electronic account is generally created with account credentials, such as an account ID and a password. Once created, the electronic account can receive different types of account data related to the user, the computing device, communications with other computing devices, or relationships with other electronic accounts. The account data related to the user can include identifying information, such as a name, an email address, a birthday, a voice sample, a handwriting sample, a photo, or a fingerprint. The account data related to the computing device can include a device type, such as a desktop computer, a laptop computer, a cellphone, or a tablet. The account data related to communications with another computing device can include communications through various channels, such as email, texting, or video conference, in terms of content, such keywords or summaries, and corresponding metadata, such as time, duration, or identification of the other computing device. The account data related to a relationship with a certain electronic account can include one of various classifications of the certain electronic account that reflects a relationship with a certain user of the certain electronic account, such as "friend", "family", "colleague", or "trusted contact". The relationship with a trusted contact in particular can be utilized in various account processes, as further discussed below. The account data related to the relationship with the certain electronic account could also include one of various classifications of the certain electronic account that reflects a level of visibility of the electronic account to the certain electronic account, such as "all visible", "only name and photo visible", or "entirely invisible".

In some embodiments, the server is programmed to collect the account data from the computing device at specific times. In an initial registration process that starts with the electronic account being created, the server can be programmed to request and receive the account data related to the relationship with the certain account or other account data. After the registration process is complete, specific account data can be collected as result of a voluntary transmission by the user's computing device, a periodic request for providing account data, or a triggering event. For the account data related to trusted contacts, the triggering event can be when the electronic account needs to be reactivated or is accessed in a suspicious manner. Furthermore, in response to receiving a classification of a certain electronic account, the server can be programmed to send a notification to the certain electronic account of the classification.

Figure 3:
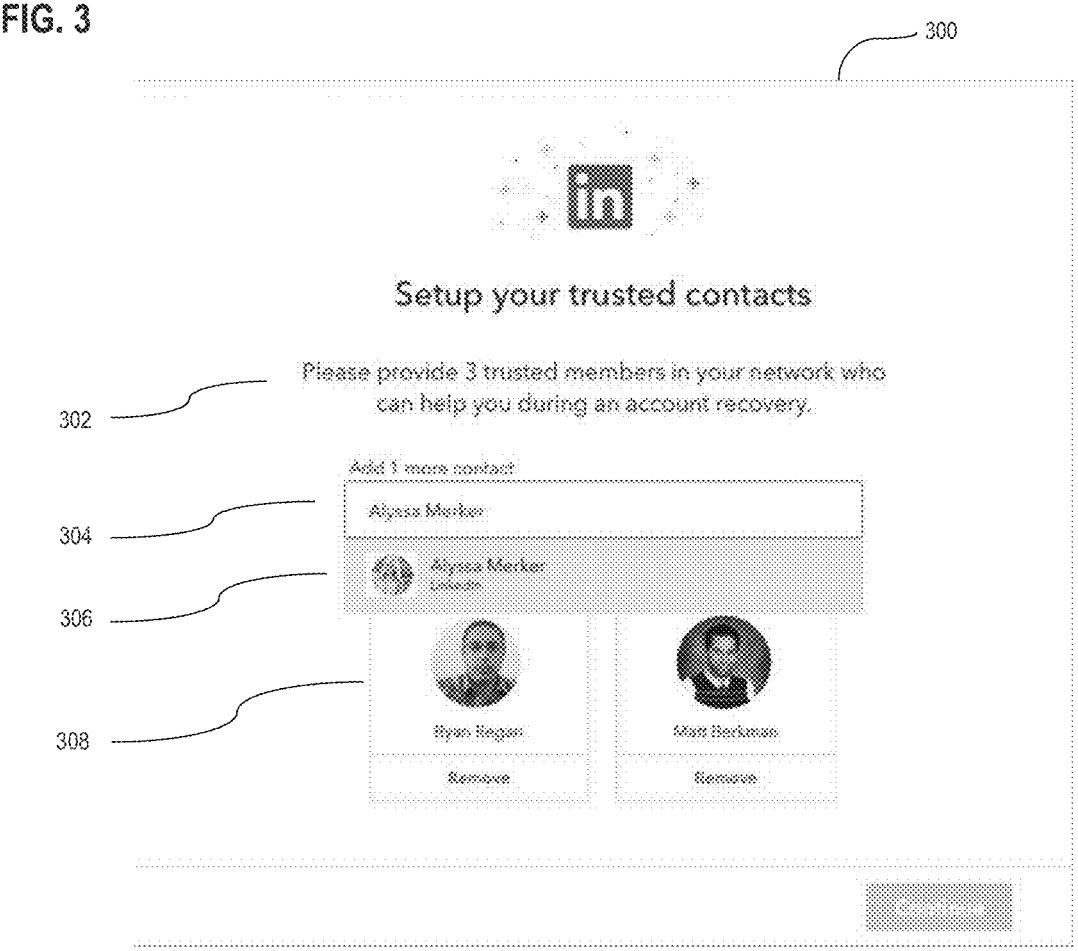
FIG. 3 illustrates an example screen of a graphical user interface for classifying electronic accounts as trusted contacts for an electronic account.

FIG. 3 illustrates an example screen of a graphical user interface for classifying electronic accounts as trusted contacts for an electronic account. In some embodiments, the screen 300 includes an instruction 302 requesting the specification of one or more trusted contacts for the electronic account. The screen 300 also includes a field 304 for identifying a trusted contact through a query, and a selectable list 306 that indicates one or more matches of the query. The query can include any information associated with an electronic account, such as an account ID or a job title of an associated user. For each of the one or more matching electronic accounts, the list 306 can include information visible to the electronic account, such as the name or a photo of an associated user. For example, the server can be programmed to receive the name of a user through the field 304, search for one or more electronic accounts of one or more users having that name, and cause a display of the drop-down list 306 of the one or more electronic accounts, the list 306 including the name and the photo of each of the one or more users. For further example, the server can be programmed to receive a selection from the list 306 and store a classification of the selected electronic account as a trusted contact for the electronic account. The screen 300 also includes a list 308 of existing trusted contacts, the list including the name and the photo of a user associated with each of the existing trusted contacts as well as an option to remove each of the classifications as a trusted contact. In response to receiving a selection from the list 306 to add a classification as a trusted contact, the server is configured to cause an updated display of the list 308 to reflect the added classification. In response to receiving a selection of an option from the list 308 to remove a classification as a trusted contact, the server is configured to remove the corresponding stored classification and cause an updated display of the list 308 to reflect the removed classification.

Handling Account Recovery Requests

In some embodiments, the server is programmed to receive a request to recover the electronic account from a specific computing device of a specific user, who may or may not be the owner or another user associated with the electronic account. In response, the server is programmed to conduct a multi-level identity verification process. The server is configured to move on to the next level only if the previous level is successful.

In the first level of the identity verification process, the server is programmed to request the specific computing device to identify at least one trusted contact for the electronic account. More specifically, the server is programmed to choose one or more electronic accounts that are not trusted contacts for this electronic account and request a selection by the specific computing device from a list of at least one trusted contact and the chosen electronic accounts. The one or more other electronic accounts can include a certain electronic account that is classified as being related to the electronic account but has not communicated extensively with the electronic account during a certain time frame, a certain electronic account that is classified as being related to the electronic account and has communicated extensively with the electronic account during the certain time frame, or a certain electronic account that is not classified as related to the electronic account. To increase the difficulty of the selection by the specific computing device, the one or more electronic accounts can include two that have similar values for at least one attribute, such as the employer of the associated user or the amount of communication with the electronic account. For each electronic account in the list of electronic accounts, the server is programmed to cause a display of identifying information visible to any computing device, such as a photo of an associated user.

Figure 4:
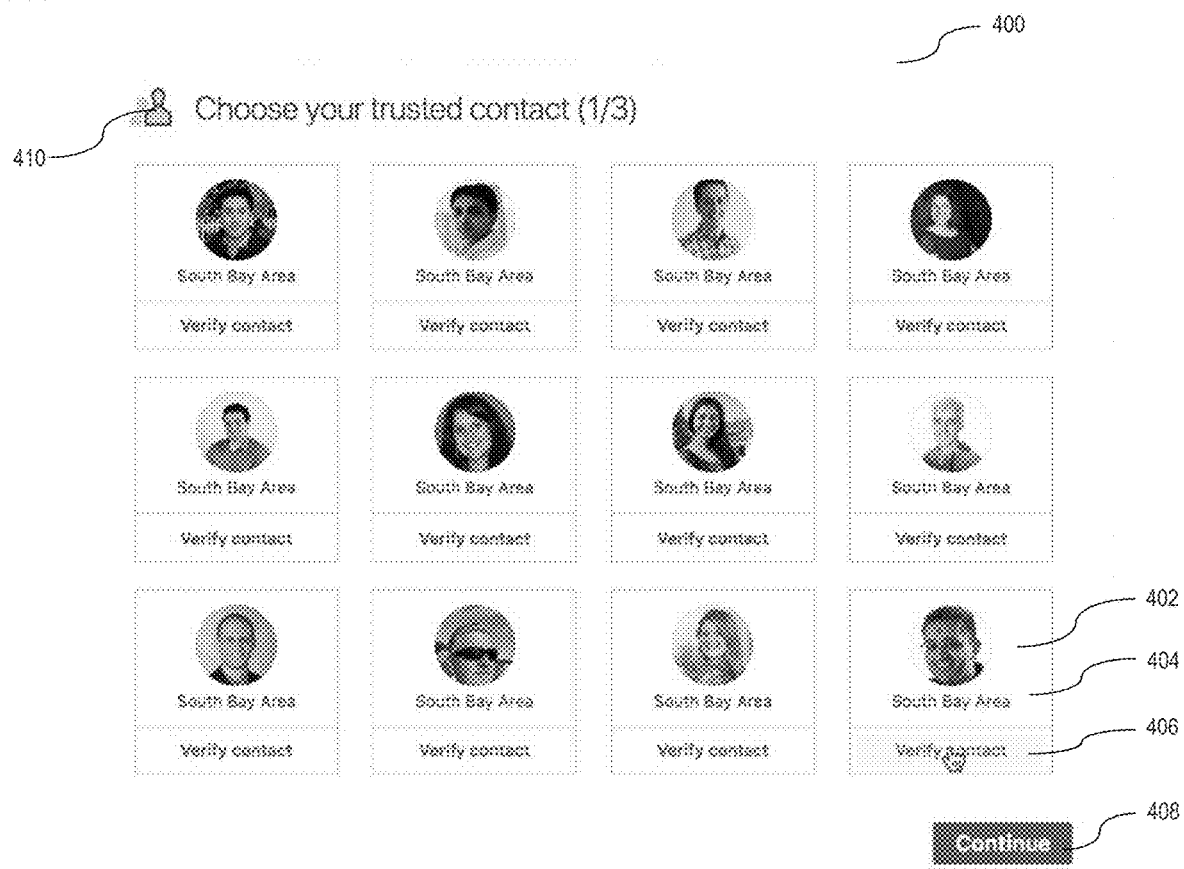
FIG. 4 illustrates an example screen of a graphical user interface for conducting the first-level identity verification involving identifying a trusted contact for an electronic account.

FIG. 4 illustrates an example screen of a graphical user interface for conducting the first-level identity verification involving identifying a trusted contact for an electronic account. In some embodiments, the screen 400 includes an instruction 410 for identifying a trusted contact. The screen 400 also includes a list of items, each generally related to a certain electronic account. For example, each item contains a photo 402 of an associated user, a location 404 associated with the certain electronic account, and an option 406 for selecting the item as representing a first trusted contact. Furthermore, the screen 400 includes an option 408 to continue the identity verification process. The option 408 can lead to selecting additional items as representing the first trusted contact or identifying another trusted contact, as further discussed below.

Figure 5:
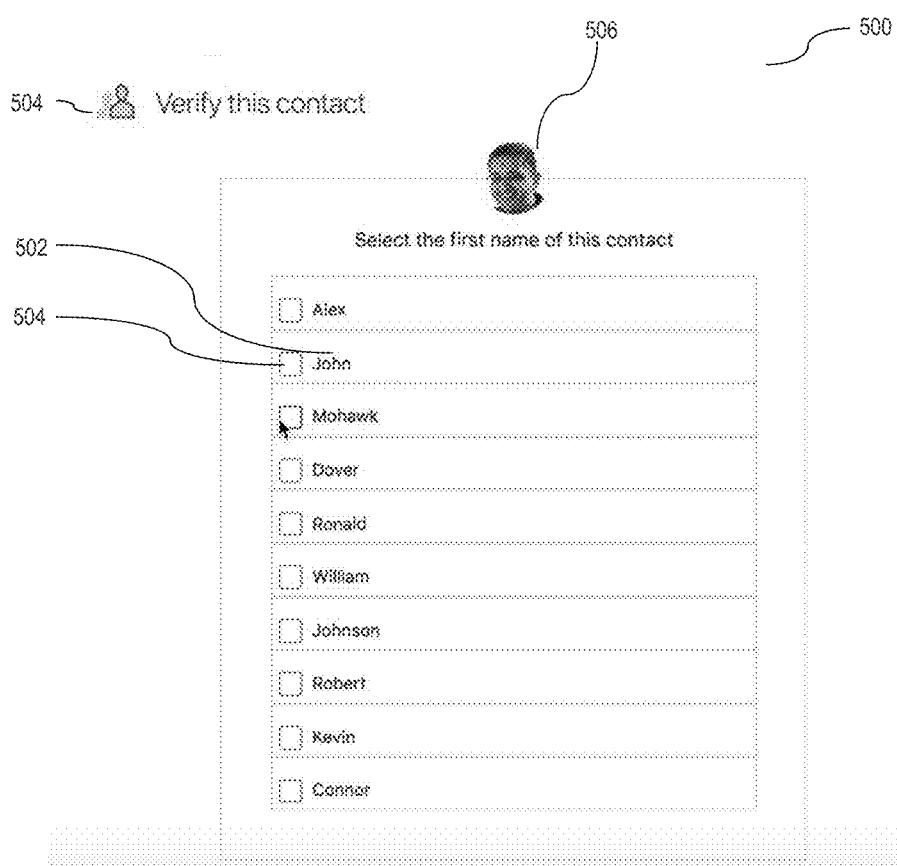
FIG. 5 illustrates an example screen of a graphical user interface for further conducting the first-level identity verification involving further identifying the trusted contact.

FIG. 5 illustrates an example screen of a graphical user interface for further conducting the first-level identity verification involving further identifying the trusted contact. The screen 500 can be presented following the screen 400 when the selected item in the screen 400 represents a trusted contact. The screen 500 includes an instruction 504 for selecting an additional item as representing the first trusted contact. The screen 500 also includes an initially selected item 506 that represents the first trusted contact, such as a photo of the associated user, which is also included in the screen 400. In addition, the screen 500 includes a list of items, each generally related to a certain electronic account. For example, each item contains a name 502 of an associated user, which is not included in the screen 400, or a random name and an option 504 for additionally selecting the item as representing the first trusted contact. This process can be extended to require the specific computing device to identify a trusted contact via s series of selections of items that represent the trusted contact.

In some embodiments, the identification of a trusted contact can be repeated for one or more arounds. In each round, the specific computing device can be requested to identify a different trusted contact in terms of the same or different attributes of a trusted contact. For example, the server can be configured to request the identification of the first trusted contact by a photo and a location of the associated user. For further example, the server can be configured to request the identification of the second trusted contact similarly by a photo and a name of the associated user or instead by a name and a job title. In any of the rounds, the server can be configured to request identifying the electronic account for which account credentials are being recovered in place of or in addition to identifying a trusted contact. Such identification can involve transmitting a real-time facial image through a camera or speech segment through a microphone, which can be compared with the account data associated with this electronic account. In any of the rounds, the specific computing device can be given a certain amount of time for identifying a trusted contact. The given time can increase from this round to the next as it might take longer to identify additional trusted contacts. In any of the rounds, the specific computing device can also be allowed more than one attempt.

In some embodiments, the first-level identity verification can involve identifying dynamically determined electronic accounts instead of pre-designated trusted contacts. For each round, the sever can be programmed to request identification of a certain electronic account corresponding to answers of questions that might indicate a trusted nature. Examples of such questions include which electronic account was previously contacted by this electronic account in case of an emergency, or which electronic account was communicated with by this electronic account more than a certain number of times last month or everyday within the certain number of days.

In some embodiments, upon a success of the first level, in which the specific computing device successfully identifies a trusted contact of this electronic account, the server is programmed to proceed to the second level. In the second level of the identity verification process, the server is programmed to send a security code to a trusted contact identified in the first. The server can be configured to automatically send the security code to the only trusted contact identified in the first level or a particular trusted contact, such as the trusted contact identified first or last in the first level. The server can also be configured to request a selection from the specific computing device of the trusted contacts identified in the first level and send the security code to the selected trusted contact, as further discussed below. After sending the security code to an identified trusted contact, the server is programmed to further request an input of the security code by the specific computing device. This approach thus requires actual communication between the identified trusted contact and the specific computing device or between the associated users. The server can be programmed to limit the communication of the security code through a specific graphical user interface or a specific online communication channel, such as in encrypted form through email. Alternatively, the server can be programmed to impose no constraint on how the security code is communicated between the identified trusted contact and the specific computing device or between the associated users. The security code can be any string of characters that is generally difficult to guess by the specific computing device or the associated user. The security code is typically generated dynamically, and either randomly or based on some predetermined rules.

Figure 6:
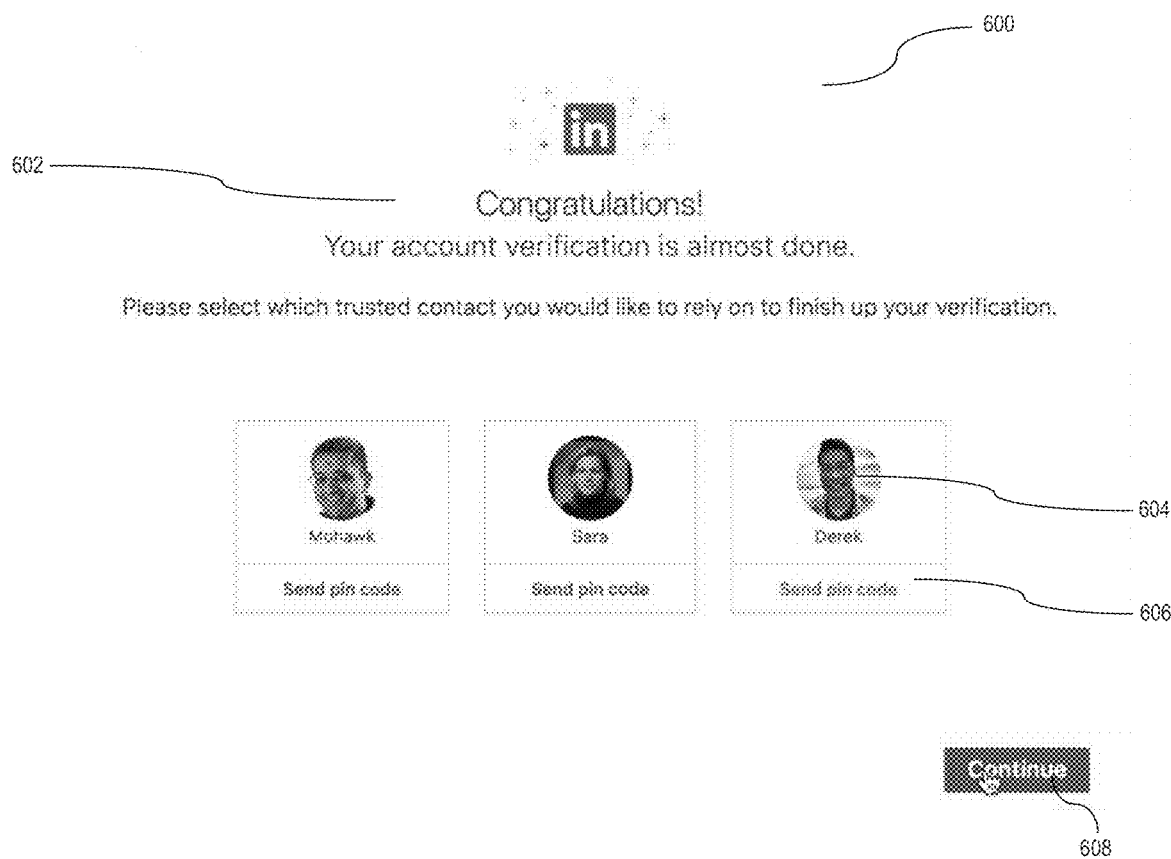
FIG. 6 illustrates an example screen of a graphical user interface for conducting the second-level identity verification for account recovery involving selecting an identified trusted contact for receiving a security code.

FIG. 6 illustrates an example screen of a graphical user interface for conducting the second-level identity verification for account recovery involving selecting an identified trusted contact for receiving a security code. In some embodiments, the screen 600 includes an instruction 602 for selecting one or more identified trusted contacts to receive the security code, such as a six-digit personal identification number. The screen 600 also includes a list of items representing the identified contacts. For example, each item contains a photo and a name 604 of an associated user and an option 606 for making the security code available to the trusted contact. The screen 600 additionally includes a continue option 608 for proceeding to the next screen. Then selection of the option 606 alone or in combination with the selection of the continue option 608 may trigger the storage of the security code in association with the trusted contact or a transmission of the security code or a notice thereof to a computing device associated with the selected trusted contact. The server can be programmed to send the same security code or different security codes to one or more trusted contacts.

Figure 7:
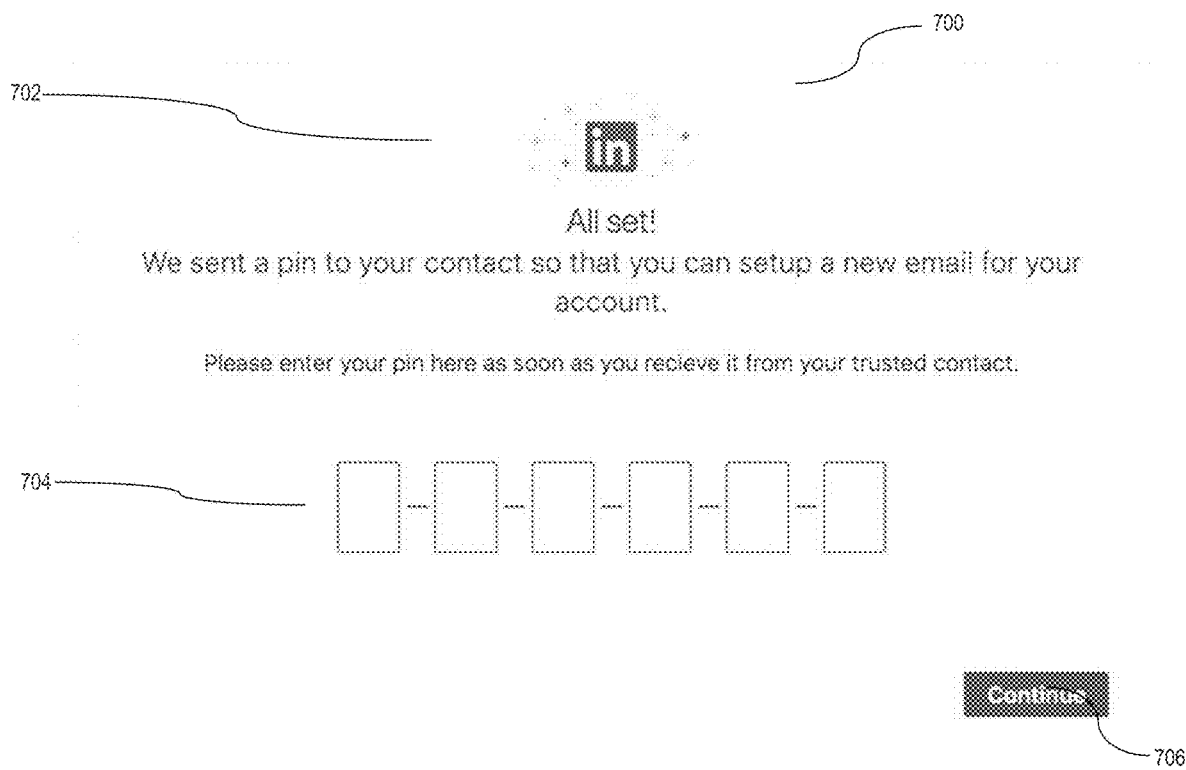
FIG. 7 illustrates an example screen of a graphical user interface for further conducting the second-level identity verification for account recovery involving providing the security code received from a trusted contact.

FIG. 7 illustrates an example screen of a graphical user interface for further conducting the second-level identity verification for account recovery involving providing the security code received from a trusted contact. The screen 700 can be presented following the screen 600. In some embodiments, the screen 700 includes an instruction 702 for providing the security code, such as a six-digit personal identification number, which was sent to a selected trusted contact. The screen 700 also includes an area 704 for entering a security code and additionally a continue option 706 for proceeding to the next screen. The filling of the area 704 with the correct security code alone or in combination with the selection of the continue option 706 can trigger the recovery of account credentials for the specific computing device.

In some embodiments, upon a success of the first level, in which the specific computing device enters the correct security code sent to an identified trusted contact, the server is programmed to recover the electronic account for the specific computing device. The recovery may involve allowing the specific computing device to update or reset the primary email address associated with the electronic account or to directly update or reset the account ID or password of the electronic account.

In some embodiments, in response to a failure during the identity verification process, the server is programmed to reject the request to recover the electronic account or revert to a default or conventional approach for recovering account credentials, such as requesting an upload of a photo ID of a user associated with the electronic account. The failure can pertain to identifying a trusted contact, such as selecting an item that does not represent a trusted contact or selecting no item within a given amount of time. The failure can pertain to selecting an identified trusted contact for receiving a security code, such as selecting no item representing an identified trusted contact within a given amount of time. In addition, the failure can pertain to confirming the security code initially sent to an identified trusted contact, such as entering the wrong security code or entering no code within a given amount of time.

In some embodiments, the server is programmed to communicate with an electronic account in various scenarios where communication between the electronic account and a trusted contact of the electronic account might be appropriate. One scenario is when the trusted contact might be attacked or when a user of the trusted contact might be in distress, in which case the server can be configured to send a recommendation to the electronic account for reaching out to the trusted contact or the associated user. For example, repeated failed attempts to access the trusted contact might suggest that the trusted contact is being hacked. For further example, any indication that the location of the computing device or the user associated with the trusted contact coincides with the location of natural disasters might suggest that the user of the trusted contact is trapped or needs supplies. In such a scenario, the server can be programmed to generally send a notification, a reminder, or a recommendation to the electronic account. The positions of electronic account and the trusted contact can be switched, where the electronic account might be attacked or when a user of the electronic account might be in distress. In that case, the server can be configured to send a recommendation to the trusted contact for reaching out to the electronic account or the associated user.

Figure 8:
FIG. 8 illustrates an example screen of a graphical user interface for indicating notifications related to trusted contacts.

FIG. 8 illustrates an example screen of a graphical user interface for indicating notifications related to trusted contacts. The screen 800 includes a list of entries or messages as reminders or recommendations for contacting a trusted contact. For example, an entry can contain the text 810 "trusted contact" to indicate that this message is related to a trusted contact. The entry can also contain a photo 808 or other data identifying the trusted contact or the associated user. The entry can further contain a description 802 of the purpose of the message, such as various attributes of an event. In addition, the entry can include an option 804 to communicate with the trusted contact, the selection of which might trigger the transmission of a default message or the presentation of a screen for the input of a specific message for the trusted contact or the associated user.

Example Processes

Figure 9:
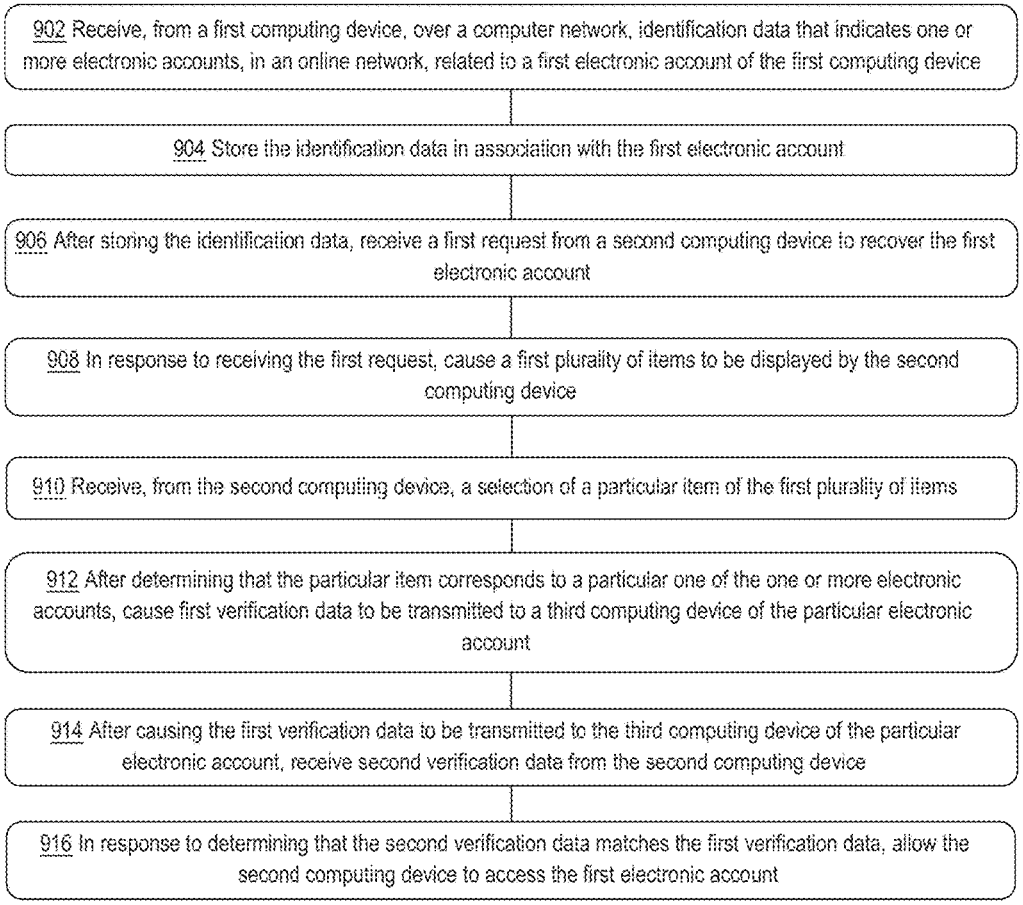
FIG. 9 illustrates an example process performed by the account manager server.

FIG. 9 illustrates an example process performed by the account management server. FIG. 9 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 902, the server is programmed or configured to receive, from a first computing device, over a computer network, identification data that indicates one or more electronic accounts, in an online network, related to a first electronic account of the first computing device. The identification data may include a classification of each of the one or more electronic accounts as a trusted contact. The identification data can be received during the initial setup of the first electronic account or afterwards.

In step 904, the server is programmed or configured to further store the identification data in association with the first electronic account. The server is programmed to also store account credentials for the first electronic account, such as an account ID and a password, in association with the first electronic account. The server can be configured to store additional types of data in association with the first electronic account, such as data concerning a user of the first electronic account, data concerning a separate communication account of the user, data concerning communications with other electronic accounts, or data concerning visibility of the account data to other electronic accounts.

In some embodiments, in step 906, the server is programmed or configured to receive, after storing the identification data, a first request from a second computing device to recover the first electronic account. The first request may indicate that the second computing device cannot provide account credentials for the first electronic account. The second computing device might be different from the first computing device.

In some embodiments, in step 908, the server is programmed or configured to cause, in response to receiving the first request, a first plurality of items to be displayed by the second computing device. The server can be configured to include in the first plurality of items a first item that corresponds to a trusted contact for the first electronic account and a second item of the same type as the first item that may or may not correspond to an electronic account. Each of the first plurality of items may include a facial photo or a name, for example, that can be used to identify an electronic account or an associated user. The server can be configured to request identification of one or more trusted contacts for the first electronic account via one or more selections from the first plurality of items displayed on the same screen or different screens. More specifically, the server can be configured to request identification of one trusted contact via a selection from each of multiple subsets of the first plurality of items displayed on the same screen or different screens. In step 910, the server is programmed or configured to receive, from the second computing device, a selection of a particular item of the first plurality of items.

In some embodiments, in step 912, the server is programmed or configured to cause, after determining that the particular item corresponds to a particular one of the one or more electronic accounts, first verification data to be transmitted to a third computing device. The third computing device can be selected from one of the trusted contacts for the first electronic account identified by the second computing device, such as the particular electronic account. The first verification data can be a string of characters having a length above a certain threshold that is generated after determining that the particular item corresponds to the particular electronic account. The server can be configured to transmit the first verification data directly to the third computing device or via other routes. For example, the server can be configured to require a transmission of the first verification data through a series of trusted contacts, with the third computing device being associated with the last one of the series. For further example, the serve can be configured to transmit an instruction to the second computing device for requesting the third computing device to obtain the first verification data from the server and transmit the first verification data to the third computing device in response to a request from the third computing device. In step 914, the server is programmed or configured to receive, after causing the first verification data to be transmitted to the third computing device, second verification data from the second computing device.

In some embodiments, in step 916, the server is programmed or configured to allow, in response to determining that the second verification data matches the first verification data, the second computing device to access the first electronic account. Allowing access to the first electronic account may comprise resetting the account credentials for the first electronic account to temporary values and transmitting the temporary values to the second computing device. Allowing access to the first electronic account may also comprise sending an instruction to the second computing device to reset the account credentials. In addition, allowing access to the first electronic account may comprise sending an instruction to the second computing device to update information identifying a primary communication account associated with the first electronic account.

In some embodiments, after determining that the particular item does not correspond to any of the one or more electronic accounts related to the first electronic account or after determining that the second verification data does not match the first verification data, the server is programmed or configured to reject the first request from the second computing device or start a backup approach for handling the first request, such as requiring an upload of a photo ID from the second computing device.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 10:
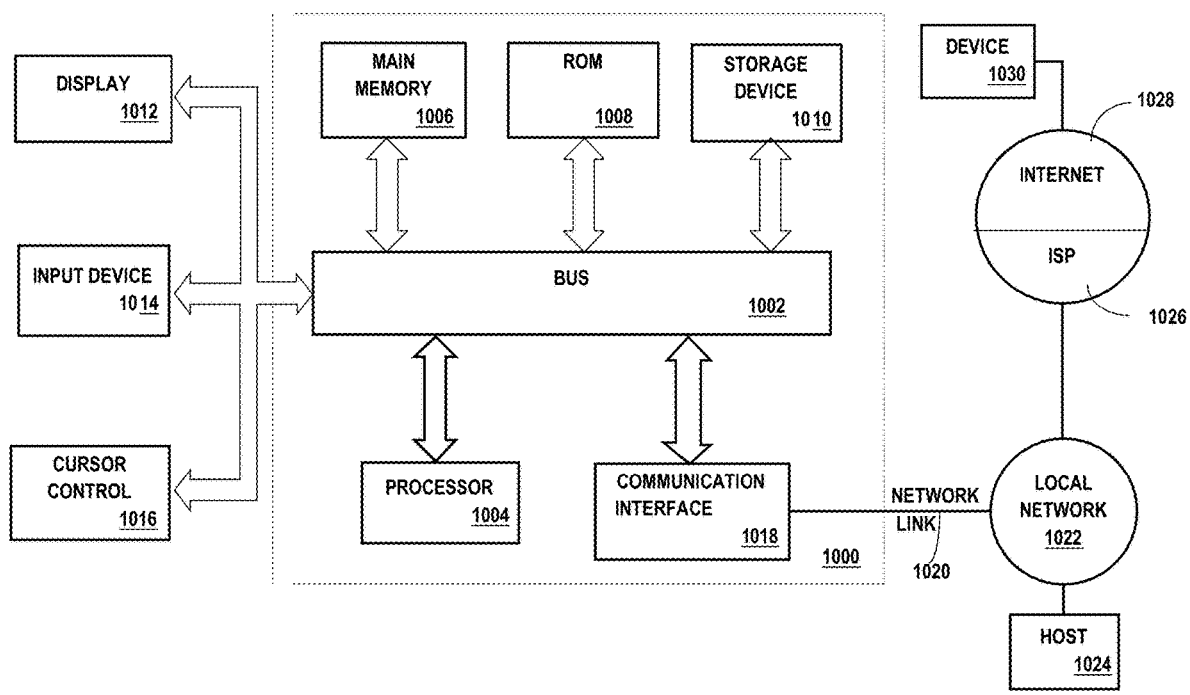
FIG. 10 is a block diagram that illustrates an example computer system with which an embodiment may be implemented.

FIG. 10 is a block diagram that illustrates an example computer system with which an embodiment may be implemented. In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which may include a bus and/or other communication mechanism(s) for communicating information and/or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller and/or a special-purpose microprocessor such as an embedded system or a graphics processing unit (GPU) or a digital signal processor or ARM processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as FLASH memory, or solid-state storage, magnetic disk or optical disk such as CD-ROM or DVD-ROM, and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1000 may be coupled via I/O subsystem 1002 to at least one output device 1012. In one embodiment, output device 1012 is a digital computer display. Examples of a display that may be used in various embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on display 1012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In another embodiment, computer system 1000 may comprise an internet of things (IoT) device in which one or more of the output device 1012, input device 1014, and control device 1016 are omitted. Or, in such an embodiment, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware and interfaces for generating position reporting packets, notifications, pulse or heartbeat signals, or other recurring data transmissions that specify a position of the computer system 1000, alone or in combination with other application-specific data, directed toward host 1024 or device 1030.

Computer system 1000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to bus 1002. Communication interface 1018 provides a two-way data communication coupling to network link(s) 1020 that are directly or indirectly connected to at least one communication networks, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a local area network (LAN), wide-area network (WAN), campus network, internetwork or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic or optical signals over signal paths that carry digital data streams representing various types of information.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices and/or computers that are operated by an Internet Service Provider (ISP) 1026. ISP 1026 provides data communication services through a world-wide packet data communication network represented as internet 1028. A device 1030 may be coupled to internet 1028. Device 1030 broadly represents any computer, data center, virtual machine or virtual computing instance with or without a hypervisor, or computer executing a containerized program system such as DOCKER or KUBERNETES. Device 1030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1000 and device 1030 may form elements of a distributed computing system that includes other computers, a processing cluster, server farm or other organization of computers that cooperate to perform tasks or execute applications or services. Device 1030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Device 1030 may comprise a web application server that hosts a presentation layer, application layer and data storage layer such as a relational database system using structured query language (SQL) or no SQL, an object store, a graph database, a flat file system or other data storage.

Computer system 1000 can send messages and receive data and instructions, including program code, through the network(s), network link 1020 and communication interface 1018. In the Internet example, a device 1030 might transmit a requested code for an application program through Internet 1028, ISP 1026, local network 1022 and communication interface 1018. The received code may be executed by processor 1004 as it is received, and/or stored in storage 1010, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, from a first computing device, over a computer network, identification data that indicates one or more electronic accounts associated with one or more users, in an online network, related to a first electronic account associated with a first user, the identification data including a classification of each of the one or more electronic accounts related to the first electronic account as a trusted contact for the first electronic account;
   storing the identification data in association with the first electronic account;
   after storing the identification data, receiving a first request from a second computing device to recover the first electronic account;
   in response to receiving the first request, causing a first plurality of items to be displayed by the second computing device based at least in part on the identification data;
   receiving, from the second computing device, a selection of a particular item of the first plurality of items;
   after determining that the particular item corresponds to a particular electronic account of the one or more electronic accounts that is associated with a particular user of the one or more users, the particular electronic account different from the first electronic account and the particular user different from the first user, causing first verification data to be transmitted to a third computing device of the particular electronic account;
   after causing the first verification data to be transmitted to the third computing device of the particular electronic account, receiving second verification data from the second computing device;
   in response to determining that the second verification data matches the first verification data, allowing the second computing device to access the first electronic account,
   wherein the method is performed by one or more computing devices.

2. The method of claim 1,
   wherein at least one of the first plurality of items does not correspond to an electronic account in the online network.

3. The method of claim 1, further comprising:
storing communication data related to communications by the first electronic account with a plurality of electronic accounts related to the first electronic account, in association with the first electronic account,
the first plurality of items including a certain item corresponding to a certain electronic account that is not classified as a trusted account for the first electronic account and an amount of communication with the certain electronic account by the first electronic account being above a threshold.

4. The method of claim 1, the particular item including a photo or a name of a user of the particular electronic account.

5. The method of claim 1, further comprising, after determining that the particular item corresponds to the particular electronic account, generating the first verification data.

6. The method of claim 1, further comprising
causing a display of a screen of a graphical user interface for inputting the second verification data,
the first verification data being a string of characters,
the second verification data being received via the screen.

7. The method of claim 1, the allowing comprising:
receiving recovery data from the second computing device identifying a communication account;
storing the recovery data in association with the first electronic account;
transmitting update data for updating account credentials for the first electronic account to the communication account.

8. The method of claim 1, further comprising, after determining that the particular item does not correspond to any of the one or more electronic accounts, rejecting the first request.

9. The method of claim 1, further comprising, in response to determining that the second verification data does not match the first verification data, transmitting a second request to the second computing device for uploading a photo ID.

10. The method of claim 1, further comprising after determining that the third computing device is not responsive, generating and sending a recommendation for reaching the particular electronic account.

11. The method of claim 1, further comprising:
in response to determining that the particular item corresponds to the particular electronic account, causing a second plurality of items to be displayed by the second computing device;
receiving, from the second computing device, a selection of a specific item of the second plurality of items;
the first verification data being transmitted after determining that the specific item corresponds to a specific electronic account of the one or more electronic accounts.

12. The method of claim 11, further comprising
receiving a selection of one of the particular electronic account or the specific electronic account;
the third computing device being associated with one of the particular electronic account or the specific electronic account that has been selected.

13. One or more non-transitory storage media storing instructions which, when executed by one or more computing devices, cause performance of a method, the method comprising:
receiving, from a first computing device, over a computer network, identification data that indicates one or more electronic accounts associated with one or more users, in an online network, related to a first electronic account associated with a first user, the identification data including a classification of each of the one or more electronic accounts related to the first electronic account as a trusted contact for the first electronic account;
storing the identification data in association with the first electronic account;
after storing the identification data, receiving a first request from a second computing device to recover the first electronic account;
in response to receiving the first request, causing a first plurality of items to be displayed by the second computing device based at least in part on the identification data;
receiving, from the second computing device, a selection of a particular item of the first plurality of items;
after determining that the particular item corresponds to a particular electronic account of the one or more electronic accounts that is associated with a particular user of the one or more users, the particular electronic account different from the first electronic account and the particular user different from the first user, causing first verification data to be transmitted to a third computing device of the particular electronic account;
after causing the first verification data to be transmitted to the third computing device of the particular electronic account, receiving second verification data from the second computing device;
in response to determining that the second verification data matches the first verification data, allowing the second computing device to access the first electronic account,
wherein the method is performed by one or more computing devices.

14. The one or more non-transitory storage media of claim 13,
wherein at least one of the first plurality of items does not correspond to an electronic account in the online network.

15. The one or more non-transitory storage media of claim 13, the method further comprising:
storing communication data related to communications by the first electronic account with a plurality of electronic accounts related to the first electronic account, in association with the first electronic account,
the first plurality of items including a certain item corresponding to a certain electronic account that is not classified as a trusted account for the first electronic account and an amount of communication with the certain electronic account by the first electronic account being above a threshold.

16. The one or more non-transitory storage media of claim 13, the method further comprising:
in response to determining that the particular item corresponds to the particular electronic account, causing a second plurality of items to be displayed by a second computing device;
receiving, from the second computing device, a selection of a specific item of the second plurality of items;
the first verification data being transmitted after determining that the specific item corresponds to a specific electronic account of the one or more electronic accounts.

17. The one or more non-transitory storage media of claim 13, the method further comprising receiving a selection of one of the particular electronic account and the specific electronic account;

the third computing device being associated with one of the particular electronic account and the specific electronic account that has been selected.

18. The one or more non-transitory storage media of claim 13, the method further comprising, after determining that the particular item corresponds to the particular electronic account, generating the first verification data.

19. The one or more non-transitory storage media of claim 13, the allowing comprising:

receiving recovery data from the second computing device identifying a communication account;

storing the recovery data in association with the first electronic account;

transmitting update data for updating account credentials for the first electronic account to the communication account.

20. The one or more non-transitory storage media of claim 13, the method further comprising, after determining that the particular item does not correspond to any of the one or more electronic accounts or determining that the second verification data does not match the first verification data, rejecting the first request or transmitting a second request to the second computing device for uploading a photo ID.

* * * * *